Patented June 11, 1935

2,004,523

UNITED STATES PATENT OFFICE 2,004,523

AMINOCARBOXYLIC ACIDS AND SALTS THEREOF

Reinhold Fick, Ludwigshafen-on-the-Rhine, Germany, assignor to I. G. Farbenindustrie Aktiengesellschaft, Frankfort-on-the-Main, Germany No Drawing. Application December 13, 1932, Serial No. 646,977. In Germany December 31, 1931

5 Claims. (Cl. 260—112)

The present invention relates to the production of aminocarboxylic acids, particularly alpha-aminocarboxylic acids, iminocarboxylic acids and their salts.

The preparation of aminocarboxylic acids by the well known methods from aldehydes or ketones, hydrocyanic acid and ammonia with subsequent saponification of the primarily formed aminocarboxylic acid nitriles, or from aqueous solutions of ammonium cyanide instead of hydrocyanic acid and ammonia, offers considerable difficulty in the carrying out on an industrial scale because usually instead of completely or even mainly uniform reaction products, mixtures of α-aminocarboxylic acids and iminodicarboxylic acids, or of their salts, respectively, are obtained.

I have now found that a substantial improvement as regards the uniformity of the reaction products is obtained by causing ammonium cyanide to act on one or more aldehydes, as for example formaldehyde, acetaldehyde, propionic, butyric and valeric aldehydes, aldoses and benzaldehyde, especially on aliphatic aldehydes of low molecular weight, such as those containing from 1 to 5 carbon atoms in the presence of considerable amounts of free ammonia, that is at least the same quantity as is contained in the ammonium cyanide, preferably by using a solution of ammonium cyanide, saturated with ammonia, the amino nitriles thus formed as primary products in a smooth reaction being saponified, preferably directly following their preparation, without previously removing the ammonia with the aid of an alkali base, that is with alkali metal or alkaline earth metal hydroxides in order to obtain alpha-aminocarboxylic acids; strong bases, such as alkali metal, barium or strontium hydroxides, are employed for the saponification, advantageously while heating as rapidly as possible, whereas in order to obtain iminodicarboxylic acids, weaker bases, such as calcium hydroxide, are employed. The ammonium cyanide may be dissolved or suspended in any solvents capable of dissolving ammonia, as for example water, alcohols, ethers, pyridine or mixtures thereof.

The temperatures employed for the condensation should not exceed 50° C. and are generally chosen between about 5° below zero centigrade and about 25° C., whereas temperatures between about 85° and about 125° C. are generallly applied to the saponification which may be carried out even at higher temperatures, say about 150° C., if the reaction be carried out while avoiding evaporation by working in a closed vessel and, if desired, introducing inert gases for increasing the pressure.

The salts obtained by the saponification may, if desired, be worked up by known methods into other salts or into the free acids; thus for example by treating a barium salt of an amino-carboxylic acid obtained by saponification with sodium sulphate or sulphuric acid, the corresponding sodium salt or the free amino acid is obtained with the separation of barium sulphate.

The following examples will further illustrate how the said invention may be carried out in practice but the invention is not restricted to these examples.

Example 1

44 kilograms of acetaldehyde are allowed to flow during the course of about 2 hours into a solution of 44 kilograms of ammonium cyanide and 47 kilograms of ammonia in about 50 kilograms of water, the temperature being kept at about 15° C. or lower, such as at about 0° C., by cooling. As soon as the ammonium cyanide has been used up to the extent that there are only traces thereof left, which is the case soon after the completion of the addition of acetaldehyde, the solution of the resulting alpha-aminopropionitrile is allowed to flow slowly into 80 kilograms of a 50 per cent aqueous caustic soda solution the temperature of which is kept continually at from about 100° to 110° C. After all the ammonia has been driven off, a concentrated solution of alpha-aminopropionic sodium salt containing only a slight amount of other substances remains behind. The yield of alpha-aminopropionic sodium salt is about 90 per cent of the theoretical yield.

Example 2

A solution of alpha-aminopropionitrile is prepared as described in Example 1 and it is allowed to flow into a boiling solution of 86 kilograms of barium hydroxide. After all the ammonia has been driven off, the solution of the barium salt is treated with the equivalent amount of a water-soluble sulphate, as for example sodium sulphate, or of free sulphuric acid, depending on whether it is desired to obtain a salt of the alpha-aminopropionic acid or the free acid itself, and the aqueous solution is separated from the precipitated barium sulphate. The yield of alpha-aminopropionic acid is about 85 per cent of the theoretical yield.

Example 3

100 kilograms of a 30 per cent aqueous formaldehyde solution are allowed to flow at about 15° C. into a solution of 44 kilograms of ammonium cyanide and 40 kilograms of ammonia in 85 kilograms of water, the resulting aminoacetic acid nitrile being then saponified in the solution with a suspension of 37 kilograms of calcium hydroxide in about 80 liters of water, the whole then being heated to boiling until ammonia is no longer evolved.

After driving off the ammonia, a solution of calcium iminodiacetate containing only a slight amount of other substances remains behind. The yield of calcium iminodiacetate is about 80 per cent of the theoretical yield.

Example 4

The crude aminonitrile solution obtained according to Example 3 is saponified by allowing it to flow into a boiling solution of 86 kilograms of barium hydroxide. A solution which contains the barium salt of alpha-aminoacetic acid to the extent of about 75 per cent is obtained.

Example 5

The crude aminonitrile solution obtained according to Example 1 is saponified by allowing it to flow into a boiling solution of 56 kilograms of potassium hydroxide in 200 kilograms of water. After driving off the ammonia, a solution of the potassium salt of alpha-amino-propionic acid is obtained. The yield of the potassium salt of alpha-amino-propionic acid is more than 85 per cent of the theoretical yield.

Example 6

The crude aminonitrile solution obtained according to Example 1 is saponified by allowing it to flow into a boiling solution of 134 kilograms of hydrated strontium hydroxide in 160 kilograms of water. In order to obtain the free acid, the solution of strontium alpha-aminopropionate thus obtained may be treated with an equivalent amount of sulphuric acid, the strontium sulphate being then removed by filtration, and the filtrate evaporated to dryness. If instead of sulphuric acid, a soluble sulphate, such as sodium sulphate or ammonium sulphate, be employed, the corresponding salts are obtained after filtration and evaporation. The yield of alpha-aminopropionate is more than 85 per cent of the theoretical yield.

What I claim is:—

1. In the production of aminocarboxylic acids and salts thereof by a condensation of an aldehyde with ammonium cyanide and subsequent saponification of the resulting aminocarboxylic acid nitrile, the step which comprises carrying out the said condensation at a temperature between about 5° below zero centigrade and about 25° C. in the presence of a quantity of free ammonia corresponding at least to that present in the combined state in said ammonium cyanide and saponifying the aminocarboxylic acid nitrile in the resulting ammoniacal solution with an alkali metal base.

2. In the production of aminocarboxylic acids and salts thereof by a condensation of an aldehyde with ammonium cyanide and subsequent saponification of the resulting aminocarboxylic acid nitrile, the step which comprises carrying out the said condensation at a temperature between about 5° below zero centigrade and about 25° C. in the presence of a quantity of free ammonia corresponding at least to that present in the combined state in said ammonium cyanide, and saponifying the aminocarboxylic acid nitrile in the resulting ammoniacal solution with an alkali metal base, at a temperature between about 85° and about 150° C. while avoiding evaporation.

3. In the production of α-aminocarboxylic acids and salts thereof by a condensation of an aldehyde with ammonium cyanide and subsequent saponification of the resulting aminocarboxylic acid nitrile, the step which comprises carrying out the said condensation in the presence of a quantity of free ammonia corresponding at least to that present in the combined state in said ammonium cyanide and saponifying the aminocarboxylic acid nitrile in the resulting ammoniacal solution with an aqueous alkali metal base.

4. In the production of aminopropionic acid and salts thereof by a condensation of acetaldehyde with ammonium cyanide in the presence of water and subsequent saponification of the resulting aminocarboxylic acid nitrile, the step which comprises carrying out the said condensation at a temperature between about 5° below zero centigrade and about 25° C. in the presence of a quantity of free ammonia corresponding at least to that present in the combined state in said ammonium cyanide and saponifying the said α-amino propionic nitrile in the resulting ammoniacal solution with an alkali metal base.

5. In the production of aminoacetic acid and salts thereof by a condensation of formaldehyde with ammonium cyanide in the presence of water and subsequent saponification of the resulting aminocarboxylic acid nitrile, the step which comprises carrying out the said condensation at a temperature between about 5° below zero C. and about 25° C. in the presence of a quantity of free ammonia corresponding at least to that present in the combined state in said ammonium cyanide and saponifying the aminoacetic nitrile in the resulting ammoniacal solution with an alkali metal base.

REINHOLD FICK.